United States Patent
Jo (10) Patent No.: US 9,491,520 B2
(45) Date of Patent: Nov. 8, 2016

(54) DISPLAY APPARATUS AND METHOD FOR CONTROLLING DISPLAY APPARATUS AND REMOTE CONTROLLER HAVING A PLURALITY OF SENSOR ARRAYS

(75) Inventor: Chan-young Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 726 days.

(21) Appl. No.: 13/440,770

(22) Filed: Apr. 5, 2012

(65) Prior Publication Data

US 2012/0314022 A1    Dec. 13, 2012

(30) Foreign Application Priority Data

Jun. 13, 2011   (KR) .................. 10-2011-0057060

(51) Int. Cl.
| | |
|---|---|
| G06F 3/042 | (2006.01) |
| H04N 21/485 | (2011.01) |
| H04N 21/4223 | (2011.01) |
| H04N 21/431 | (2011.01) |
| H04N 21/482 | (2011.01) |
| H04N 13/04 | (2006.01) |
| G06F 3/0482 | (2013.01) |
| G06F 3/0346 | (2013.01) |
| G06F 3/0484 | (2013.01) |
| G06F 3/0481 | (2013.01) |

(52) U.S. Cl.
CPC .......... *H04N 21/485* (2013.01); *G06F 3/0346* (2013.01); *G06F 3/0482* (2013.01); *G06F 3/04812* (2013.01); *G06F 3/04847* (2013.01); *H04N 13/0468* (2013.01); *H04N 13/0497* (2013.01); *H04N 21/4223* (2013.01); *H04N 21/4312* (2013.01); *H04N 21/4821* (2013.01); *G06F 2203/04802* (2013.01)

(58) Field of Classification Search
CPC ..................... H04N 21/4223; H04N 21/4312; H04N 13/0468; G06F 3/0482; G06F 3/04815; G06F 3/017; G06F 3/011; G06F 3/0428; G06F 3/0421; G06F 3/0304
USPC ...................... 348/42, 51, 734; 345/175, 156
See application file for complete search history.

(56) References Cited

U.S. PATENT DOCUMENTS

| | | | | |
|---|---|---|---|---|
| 3,478,220 A | * | 11/1969 | Milroy | G01V 8/20 250/221 |
| 3,559,478 A | * | 2/1971 | Iberall | 73/178 R |
| 4,205,304 A | * | 5/1980 | Moore | G06F 3/0421 178/18.09 |

(Continued)

FOREIGN PATENT DOCUMENTS

| | | | |
|---|---|---|---|
| CN | CH200944226 | * | 9/2007 |
| EP | 0571702 A2 | | 12/1993 |

(Continued)

OTHER PUBLICATIONS

Communication issued Jun. 11, 2012 by the European Patent Office in counterpart European Application No. 12159044.2.

(Continued)

Primary Examiner — David Harvey
(74) Attorney, Agent, or Firm — Sughrue Mion, PLLC (57) ABSTRACT

Controlling operations of a display apparatus using a remote controller that detects user motion in a three-dimensional space and transmits the detected motion of the user in the three-dimensional space to thereby determine commands corresponding to the detected motion of the user.

21 Claims, 8 Drawing Sheets

(56) References Cited

U.S. PATENT DOCUMENTS

| | | | | |
|---|---|---|---|---|
| 4,302,138 A * | 11/1981 | Zarudiansky | B25J 3/04 414/5 |
| 4,384,201 A * | 5/1983 | Carroll | G01V 8/20 250/221 |
| 4,746,770 A * | 5/1988 | McAvinney | 178/18.09 |
| 4,905,174 A * | 2/1990 | Ouchi | G06F 3/0421 178/18.09 |
| 4,998,014 A * | 3/1991 | Hasegawa | G06F 3/0421 250/221 |
| 5,594,469 A * | 1/1997 | Freeman et al. | 345/158 |
| 5,608,209 A * | 3/1997 | Matsuda | A61B 5/1105 119/421 |
| 5,808,606 A * | 9/1998 | Kodama | G06F 3/0421 345/156 |
| 5,880,462 A * | 3/1999 | Hsia | H03K 17/943 250/221 |
| 6,130,663 A * | 10/2000 | Null | G06F 3/0213 178/18.04 |
| 6,198,485 B1 * | 3/2001 | Mack | G06F 3/013 345/156 |
| 6,366,276 B1 * | 4/2002 | Kunimatsu | G06F 3/0421 345/173 |
| 6,498,628 B2 | 12/2002 | Iwamura | 348/734 |
| 7,123,180 B1 * | 10/2006 | Daniell et al. | 341/176 |
| 7,227,526 B2 * | 6/2007 | Hildreth | G06T 19/006 345/156 |
| 7,817,134 B2 * | 10/2010 | Huang et al. | 345/158 |
| 7,821,531 B2 * | 10/2010 | Yoda et al. | 348/143 |
| 7,825,902 B2 * | 11/2010 | Wong | G06F 3/0421 178/18.01 |
| 7,877,076 B2 * | 1/2011 | Walkington | 455/323 |
| 7,877,706 B2 * | 1/2011 | Albertson et al. | 715/863 |
| 8,000,924 B2 * | 8/2011 | Sato et al. | 702/153 |
| 8,135,246 B2 * | 3/2012 | Juni | G02B 6/12004 385/12 |
| 8,139,029 B2 * | 3/2012 | Boillot | G06F 3/0325 345/158 |
| 8,352,199 B2 * | 1/2013 | Lan | G01F 1/00 345/156 |
| 8,368,819 B2 * | 2/2013 | Lee et al. | 348/734 |
| 8,432,305 B2 * | 4/2013 | Choi et al. | 341/176 |
| 8,456,421 B2 * | 6/2013 | Ni et al. | 345/158 |
| 8,456,422 B2 * | 6/2013 | Yamamoto et al. | 345/158 |
| 8,552,983 B2 * | 10/2013 | Chiu | 345/166 |
| 8,593,402 B2 * | 11/2013 | Stinson, III | 345/157 |
| 8,614,669 B2 * | 12/2013 | Marc | G06F 3/0304 345/158 |
| 8,614,694 B2 * | 12/2013 | Lin et al. | 345/175 |
| 8,686,943 B1 * | 4/2014 | Rafii | 345/158 |
| 8,773,512 B1 * | 7/2014 | Rafii | G06F 3/017 348/47 |
| 8,780,278 B2 * | 7/2014 | Gulati | 348/734 |
| 8,786,576 B2 * | 7/2014 | Jung | G06F 3/0304 345/175 |
| 8,823,648 B2 * | 9/2014 | Godwin | 345/158 |
| 8,860,672 B2 * | 10/2014 | Ewing, Jr. | G06F 1/1686 345/173 |
| 8,878,775 B2 * | 11/2014 | Cho et al. | 345/156 |
| 8,971,572 B1 * | 3/2015 | Yin et al. | 382/103 |
| 8,975,567 B2 * | 3/2015 | Sekizawa | G06F 3/0421 250/206.1 |
| 2002/0036617 A1 | 3/2002 | Pryor | 345/156 |
| 2002/0057383 A1 | 5/2002 | Iwamura | G08C 23/00 348/734 |
| 2003/0014574 A1 * | 1/2003 | Kuo et al. | 710/62 |
| 2003/0014575 A1 * | 1/2003 | Wang et al. | 710/62 |
| 2003/0063115 A1 * | 4/2003 | Kaku | G06F 3/0421 715/711 |
| 2003/0214481 A1 * | 11/2003 | Xiong | 345/157 |
| 2004/0041828 A1 * | 3/2004 | Zellhoefer | G06F 3/011 715/706 |
| 2004/0095268 A1 * | 5/2004 | Miyazaki | 341/176 |
| 2004/0227741 A1 * | 11/2004 | Koda | G06F 3/017 345/183 |
| 2006/0007176 A1 * | 1/2006 | Shen | G06F 3/04883 345/173 |
| 2006/0023410 A1 * | 2/2006 | Solomon et al. | 361/683 |
| 2006/0274038 A1 * | 12/2006 | Redkov | G06F 3/0482 345/157 |
| 2007/0057946 A1 | 3/2007 | Albeck et al. | |
| 2007/0130582 A1 * | 6/2007 | Chang et al. | 725/37 |
| 2007/0165012 A1 * | 7/2007 | Koda | 345/184 |
| 2007/0220437 A1 * | 9/2007 | Boillot | 715/762 |
| 2008/0089587 A1 * | 4/2008 | Kim | G06F 3/017 382/190 |
| 2008/0106527 A1 * | 5/2008 | Cornish | G02B 6/12004 345/176 |
| 2008/0120577 A1 * | 5/2008 | Ma et al. | 715/863 |
| 2009/0009569 A1 * | 1/2009 | Sasaki | 347/85 |
| 2009/0066648 A1 * | 3/2009 | Kerr et al. | 345/158 |
| 2009/0128498 A1 * | 5/2009 | Hollemans et al. | 345/173 |
| 2009/0139778 A1 * | 6/2009 | Butler et al. | 178/18.03 |
| 2009/0183125 A1 * | 7/2009 | Magal et al. | 715/863 |
| 2009/0184922 A1 * | 7/2009 | Lou | 345/156 |
| 2009/0322680 A1 * | 12/2009 | Festa | 345/160 |
| 2010/0002995 A1 * | 1/2010 | Juni | G02B 6/12004 385/33 |
| 2010/0036393 A1 * | 2/2010 | Unsworth | A61B 19/2203 606/130 |
| 2010/0039378 A1 | 2/2010 | Yabe et al. | |
| 2010/0060722 A1 | 3/2010 | Bell | |
| 2010/0123684 A1 * | 5/2010 | Hiyoshi | G06F 3/042 345/175 |
| 2010/0134531 A1 * | 6/2010 | Kinugasa | G06F 1/3203 345/690 |
| 2010/0194860 A1 * | 8/2010 | Mentz et al. | 348/47 |
| 2010/0234094 A1 * | 9/2010 | Gagner | G07F 17/32 463/20 |
| 2011/0025622 A1 * | 2/2011 | Juni | G06F 3/0421 345/173 |
| 2011/0037695 A1 * | 2/2011 | Bor et al. | 345/158 |
| 2011/0179368 A1 * | 7/2011 | King | G06F 3/04815 715/769 |
| 2011/0199298 A1 * | 8/2011 | Bassompiere et al. | 345/157 |
| 2011/0235855 A1 * | 9/2011 | Smith | 382/103 |
| 2011/0260965 A1 * | 10/2011 | Kim | G06F 3/013 345/156 |
| 2011/0279397 A1 * | 11/2011 | Rimon | G06F 3/044 345/173 |
| 2011/0298708 A1 * | 12/2011 | Hsu et al. | 345/158 |
| 2012/0056846 A1 * | 3/2012 | Zaliva | G06F 3/0416 345/174 |
| 2012/0194650 A1 * | 8/2012 | Izadi et al. | 348/47 |
| 2012/0218395 A1 * | 8/2012 | Andersen | G06F 3/017 348/77 |
| 2012/0229377 A1 * | 9/2012 | Kim et al. | 345/157 |
| 2012/0274560 A1 * | 11/2012 | Caritu et al. | 345/158 |
| 2013/0265457 A1 * | 10/2013 | Henty | 348/211.99 |
| 2013/0332833 A1 * | 12/2013 | Park et al. | 715/719 |

FOREIGN PATENT DOCUMENTS

| | | | |
|---|---|---|---|
| JP | 360017365 A | * | 1/1985 |
| JP | 405189137 A | * | 1/1992 |
| JP | 404355815 A | * | 12/1992 |
| JP | 08335125 A | * | 12/1996 |
| TW | 200933462 | * | 8/2009 |
| WO | WO 01/27868 | * | 4/2001 |

OTHER PUBLICATIONS

Communication from the European Patent Office issued Feb. 17, 2015 in a counterpart European Application No. 12159044.2.

Communication issued Oct. 30, 2015, issued by the European Patent Office in counterpart European Patent Application No. 12159044.2.

\* cited by examiner

CALCULATE MEDIAN VALUE

FIG. 3B

CALCULATE MAXIMUM VALUE

DISPLAY APPARATUS AND METHOD FOR CONTROLLING DISPLAY APPARATUS AND REMOTE CONTROLLER HAVING A PLURALITY OF SENSOR ARRAYS

CROSS-REFERENCE TO RELATED APPLICATIONS

This application claims priority from Korean Patent Application No. 2011-0057060 filed on Jun. 13, 2011, in the Korean Intellectual Property Office, the entire disclosure of which is incorporated herein by reference.

BACKGROUND

1. Field

Exemplary embodiments of present disclosure generally relate to a display apparatus, a method for controlling the display apparatus, and a remote controller. More particularly, the exemplary embodiments relate to a display apparatus controlled by an external remote controller, a method for controlling the display apparatus, and a remote controller.

2. Description of Related Art

Recently, a device for receiving a user's input to a display device (hereafter, referred to as a user input device) may include an optical mouse, a touch panel, a motion sensor, and the like. In particular, the user input device is becoming intelligent and enhanced to improve the user's convenience.

Meanwhile, TVs and monitors are advancing to multi-function smart display devices including Internet capability. Particularly, a 3D display device is invigorated and corresponding contents or Graphical User Interface (GUI) is demanded.

However, while the display devices, such as a TV or a monitor, become large, smart, multi-functional, and three-dimensional, the user input device lacks the capability to catch up with the user input environment of the display device.

To address such a situation, a touch panel and a motion sensing remote controller are used. Disadvantageously, the user needs to get close to the large screen to use the touch panel and hold the remote controller in a hand to use the motion sensing remote controller.

SUMMARY

Aspects of the exemplary embodiments are provided to solve the above-mentioned and/or other problems and disadvantages. An aspect of the exemplary embodiments provides a display apparatus for receiving a remote controller signal from a remote controller, which detects a user motion in a three dimensional space defined by a plurality of sensor arrays arranged in three axis directions, controlling the display device according to the user motion in the three dimensional space, a method for controlling the display apparatus, and a remote controller.

Additional aspects of the exemplary embodiments will be set forth in part in the description which follows and, in part, will be obvious from the description, or may be learned by practice.

According to an aspect of the exemplary embodiments, a display apparatus includes a receiving unit that receives a signal from a remote controller, the signal indicating a user motion detected by the remote controller in a three-dimensional space defined by a plurality of sensor arrays arranged in three axis directions of the three-dimensional space; and a control unit that performs a control operation to control the display apparatus according to the signal indicating the user motion in the three-dimensional space.

The display apparatus may further include a Graphical User Interface (GUI) generation unit that generates a GUI; and a display unit that displays the GUI. The control unit controls the GUI generation unit and the display unit to change the GUI displayed on the display unit according to attributes of the user motion of the three-dimensional space detected by the remote controller and received in the signal from the remote controller, and the attributes of the user motion include at least one of a motion direction, a motion distance, a motion speed, and a motion pattern.

The display apparatus may further include a GUI generation unit that generates a GUI represented in two dimensions; and a display unit that displays the GUI and a cursor. The control unit moves the cursor displayed on the GUI according to a user motion of two axis directions in the three-dimensional space, and selects an item of the GUI pointed to by the cursor according to a user motion of a remaining axis direction other than the two axis directions.

When the item of the GUI is selected, the control unit adjusts a setting value of the item according to user motion of one axis direction in the user motion of the three axis directions.

When the item is a volume control menu and the volume control menu is selected, the control unit increases a volume of the display apparatus as the user motion of the one axis direction moves in a first direction, and decreases the volume of the display apparatus as the user motion of the one axis direction moves in a second direction that is opposite the first direction.

When the item is a channel change menu and the channel change menu is selected, the control unit increases a channel of the display apparatus as the user motion of the one axis direction moves in a first direction, and decreases the channel of the display apparatus as the user motion of the one axis direction moves in a second direction that is opposite the first direction.

The display apparatus may further include a GUI generation unit that generates a three-dimensional GUI; and a display unit that displays the three-dimensional GUI I. The control unit may change a display status of the three-dimensional GUI according to the user motion of the three-dimensional space detected by the remote controller and received in the signal from the remote controller, and select a menu displayed in the three-dimensional GUI.

The control unit may detect a center sensor or an outermost sensor in each axis direction based on locations of sensors for detecting the user motion with respect to each of the plurality of the sensor arrays, and determine the user motion according to a location of the detected center sensor or outermost sensor.

The display apparatus may further include a coordinate calculation unit that calculates a motion coordinate value of a user in the three-dimensional space according to the signal received from the remote controller. The control unit confirms the user motion according to the motion coordinate value calculated by the coordinate calculation unit.

The plurality of the sensor arrays may have different operating frequencies.

According to another aspect of the exemplary embodiments, a method of controlling a display apparatus includes receiving a signal from a remote controller, the signal indicating a user motion detected by the remote controller in a three-dimensional space defined by a plurality of sensor arrays arranged in three axis directions of the three-dimensional space; and controlling the display apparatus according to the signal indicating the user motion in the three-dimensional space.

The controlling may include changing display of a Graphical User Interface (GUI) displayed on a display of the display apparatus according to attributes of the user motion of the three-dimensional space detected by the remote controller and received in the signal from the remote controller, and the attributes of the user motion may include at least one of a motion direction, a motion distance, a motion speed, and a motion pattern.

The controlling may further include moving a cursor displayed on a two-dimensional GUI according to a user motion of two axis directions in the three-dimensional space, and selecting an item of the two-dimensional GUI pointed to by the cursor according to a user motion of a remaining axis direction.

The controlling may further include when the item of the GUI is selected, adjusting a setting value of the item according to user motion of one axis direction in the user motion of the three axis directions.

When the item is a volume control menu, the controlling may further include when the volume control menu is selected, increasing a volume of the display apparatus as the user motion of the one axis direction moves in a first direction and decreasing the volume of the display apparatus as the user motion of the one axis direction moves in a second direction that is opposite the first direction.

When the item is a channel change menu, the controlling may further include when the channel change menu is selected, increasing a channel of the display apparatus as the user motion of the one axis direction moves in a first direction, and decreasing the channel of the display apparatus as the user motion of the one axis direction moves in a second direction that is opposite the first direction.

The controlling may further include changing a display status of a three-dimensional GUI according to the user motion of the three-dimensional space detected by the remote controller and received in the signal from the remote controller, and selecting a menu displayed in the three-dimensional GUI.

The controlling may include detecting a center sensor or an outermost sensor in each axis direction based on locations of sensors detecting the user motion with respect to each of the plurality of the sensor arrays, and determining the user motion according to a location of the detected center sensor or outermost sensor.

The method may further include calculating a motion coordinate value of a user in the three-dimensional space according to the signal received from the remote controller. The controlling confirms the user motion according to the calculated motion coordinate value.

The plurality of the sensor arrays may have different operating frequencies.

According to yet another aspect of the exemplary embodiments, a remote controller includes a sensing unit that senses user motion in a three-dimensional space defined by a plurality of sensor arrays arranged in three axis directions of the three-dimensional space; and a remote controller signal transmitting unit that transmits a signal indicating the sensed user motion to a display apparatus.

The sensing unit may include first and second sensing units, respectively, arranged in a matrix form and connected by a hinge each other, and the first and second sensing units are rotated based on the hinge to open and close the remote controller.

The plurality of the sensor arrays may have different operating frequencies.

BRIEF DESCRIPTION OF THE DRAWINGS

These and/or other aspects of the exemplary embodiments will become apparent and more readily appreciated from the following description of the exemplary embodiments, taken in conjunction with the accompanying drawings of which.

DETAILED DESCRIPTION OF THE EXEMPLARY EMBODIMENTS

Reference will now be made in detail to the exemplary embodiments, examples of which are illustrated in the accompanying drawings, wherein like reference numerals refer to the like elements throughout. The exemplary embodiments are described below to explain the concepts of the disclosure by referring to the figures.

Figure 1:
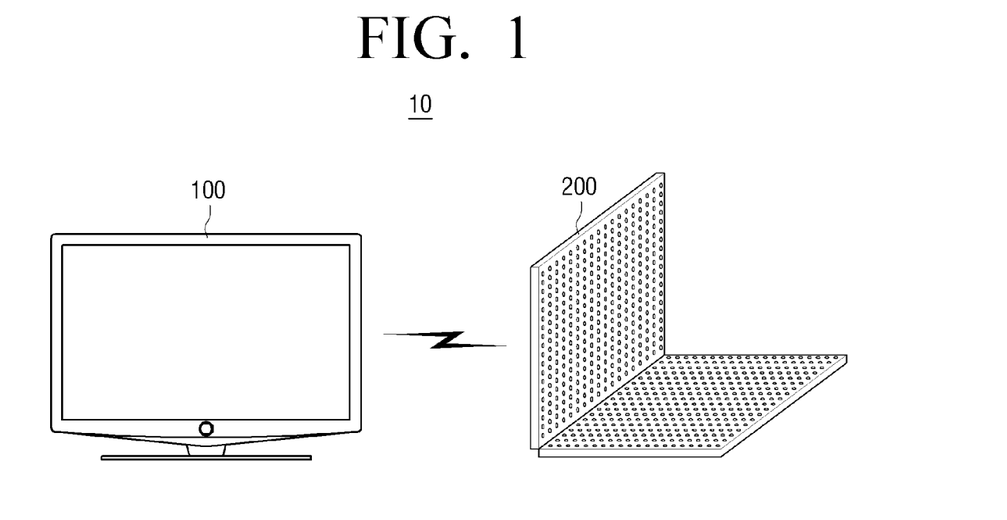
FIG. 1 is a diagram of a display system according to an exemplary embodiment.

FIG. 1 is a diagram of a display system 10 according to an exemplary embodiment. As shown in FIG. 1, the display system 10 includes a display apparatus 100 for displaying an input video, and a remote controller 200 for receiving a user command.

The display apparatus 100 processes videos input from various sources and displays the processed videos to a user. In particular, the display apparatus 100 performs an operation according to a remote controller signal received from the external remote controller 200, which shall be explained in detail by referring to FIGS. 2 through 7.

Herein, the display apparatus 100 can be implemented using, but not limited to, a TV, a monitor, a projection, a notebook, and the like. The display apparatus 100 can include a three-dimensional (3D) display function to create a 3D image and a 3D Graphical User Interface (GUI).

The remote controller 200 detects a user's motion through one or more sensor arrays. In more detail, the remote controller 200 detects the user's motion in a three-dimensional space defined by a coverage area of the sensor arrays, using the sensor arrays arranged in three axis directions.

In so doing, the remote controller 200 can detect the user's motion in the three-dimensional space using the sensor arrays arranged in two sides, by way of example as shown in FIG. 1. It is noted that the remote controller 200 can detect the user's motion in the three-dimensional space using the sensor arrays arranged in three, four, or five sides.

The remote controller 200 generates a remote controller signal including the user motion information in the three-dimensional space detected by the sensor arrays, and sends the remote controller signal to the external display apparatus 100.

Hence, by detecting the user's motion in the three-dimensional space defined the sensor arrays, the user can control the display apparatus 100 more intuitively.

Figure 2:
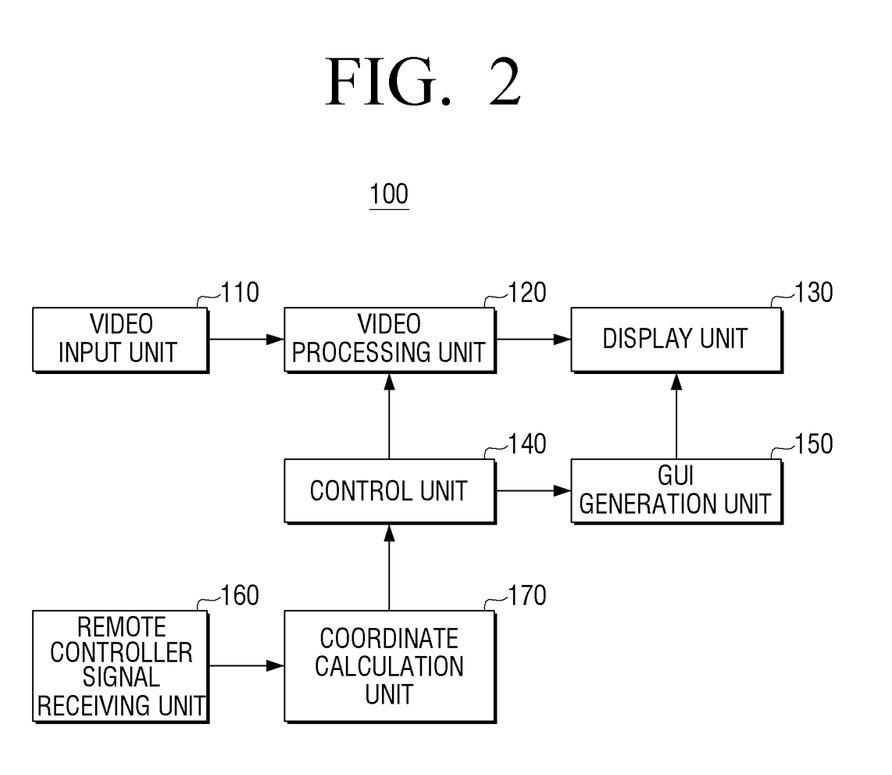
FIG. 2 is a block diagram of a display apparatus according to an exemplary embodiment.
Figure 3A:
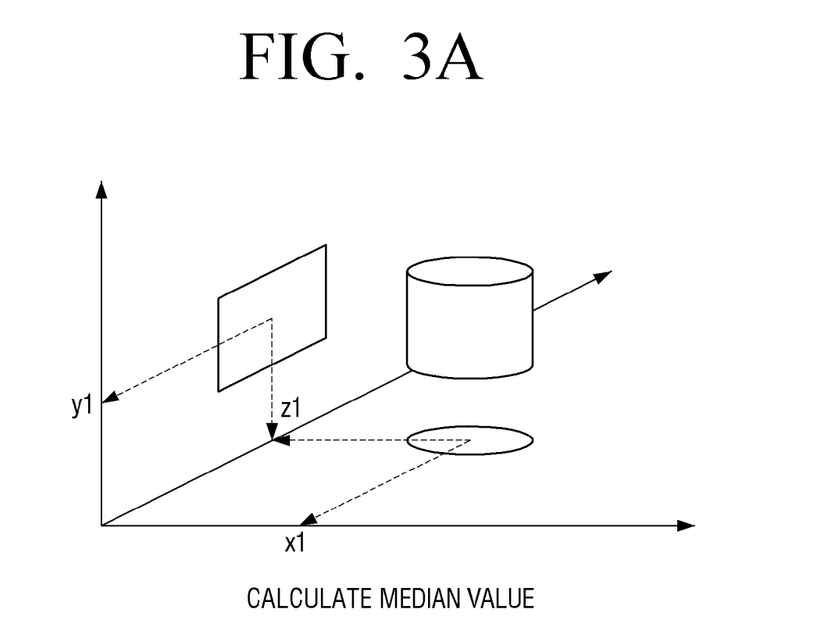
FIGS. 3A and 3B are diagrams of a method for calculating a coordinate value according to an exemplary embodiment.
Figure 3B:
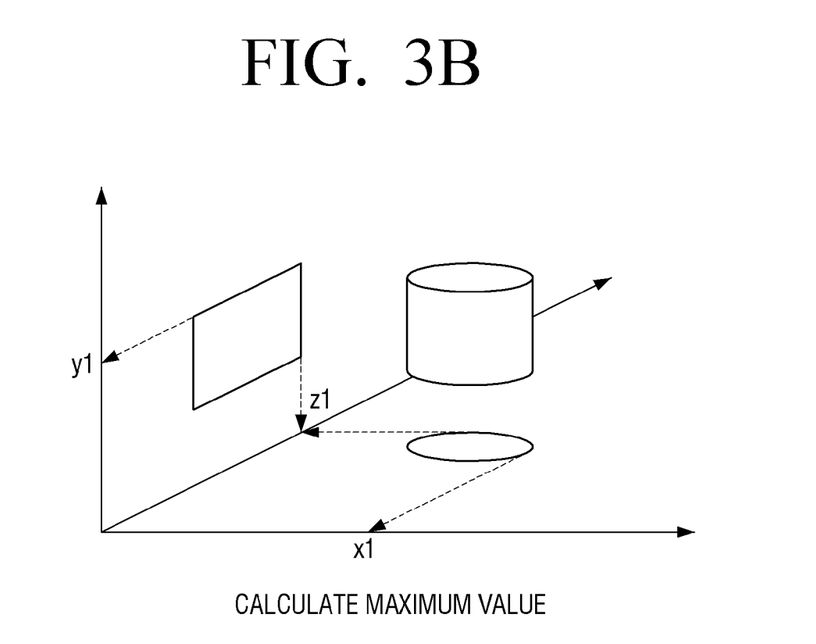
Figure 4:
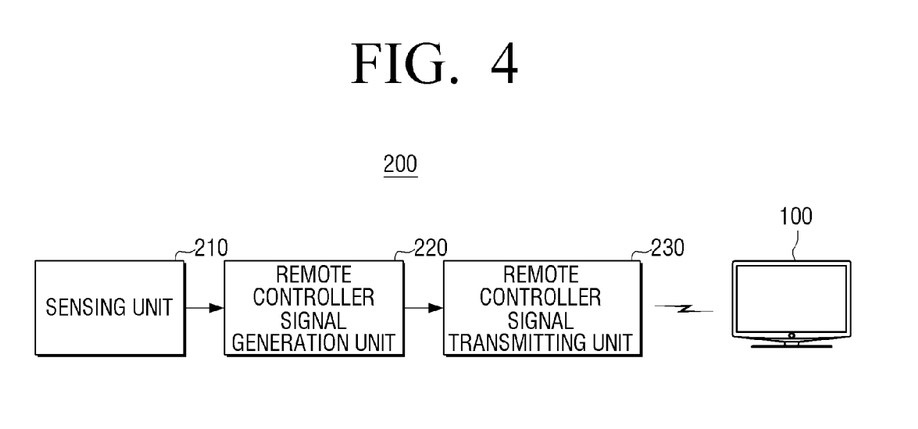
FIG. 4 is a block diagram of a remote controller according to an exemplary embodiment.

Now, the display apparatus 100 and the remote controller 200 are described in more detail by referring to FIGS. 2, 3, and 4.

FIG. 2 is a block diagram of the display apparatus 100 according to an exemplary embodiment. As shown in FIG. 2, the display apparatus 100 includes a video input unit 110, a video processing unit 120, a display unit 130, a control unit 140, a GUI generation unit 150, a remote controller signal receiving unit 160, and a coordinate calculation unit 170.

The video input unit 110 receives video signals from various sources (not shown). In detail, the video input unit 110 can receive the video signal from an external device (DVD, set-top box, etc.) connected wirelessly or by wire to the display apparatus, and may receive a broadcasting signal from a broadcasting station or a satellite.

The video processing unit 120 performs signal processing, such as video decoding and video scaling, to the input video signal. The video processing unit 120 outputs the processed video signal to the display unit 130, or compresses and stores the video signal in a storage unit (not shown).

The display unit 130 outputs the video signal processed by the video processing unit 120. The display unit 130 can display a GUI generated by the GUI generation unit 150 together with the processed video.

The GUI generation unit 150 generates the GUI for the user. The GUI generated by the GUI generation unit 150 can be displayed as an On Screen Display (OSD) menu in the screen. The GUI generation unit 150 can generate not only a two-dimensional GUI but also a three-dimensional GUI. The GUI generated by the GUI generation unit 150 shall be explained later.

The remote controller signal receiving unit 160 receives the remote controller signal from the external remote controller 200. The remote controller signal includes information relating to the user motion detected in the three-dimensional space defined by the plurality of the sensor arrays, using the sensor arrays arranged in the three axis directions. Herein, the remote controller signal includes on/off information of sensors of the sensor arrays.

The coordinate calculation unit 170 calculates coordinate values of the three-dimensional space using the remote controller signal received from the remote controller signal receiving unit 160. In detail, the coordinate calculation unit 170 calculates the plurality of the coordinate values in the three-dimensional space for the user motion, using the on/off information of the sensors contained in the remote controller signal.

Under control of the control unit 140, the coordinate calculation unit 170 can detect a center sensor or an outermost sensor in each axis direction based on the locations of the sensors detecting the user motion with respect to the plurality of the sensor arrays, and output the coordinate values for the user motion according to the location of the detected sensor.

That is, as shown in FIG. 3A, the coordinate calculation unit 170 can output a median value for each axis among the calculated coordinates, as the coordinate value for the user motion. Alternatively, as shown in FIG. 3B, the coordinate calculation unit 170 can output a maximum value for each axis among the calculated coordinates, as the coordinate value for the user motion. Those output values are mere examples, and a combination of the median value and the maximum value can be output as the coordinate value for the user motion. For example, the x and y axes can output the median value and the z axis can output the maximum value, as the coordinate value for the user motion.

The control unit 140 controls the operations of the display apparatus 100 according to signals received from the remote controller corresponding to a user command input through the remote controller 200.

More specifically, the control unit 140 controls the display apparatus 100 using the information of the user motion detected in the three-dimensional space defined by the plurality of the sensor arrays received from the remote controller 200.

In further detail, the control unit 140 controls the GUI generation unit 150 to change the display of the GUI according to attributes of the user motion in the three-dimensional space. In so doing, the attributes of the user motion can include at least one of a motion direction, a motion distance, a motion speed, and a motion pattern.

For example, when the user's motion in the three-dimensional space moves in the z axis direction, the control unit 140 can adjust the GUI size according to the user's motion direction. When the motion moves in the positive direction based on the z axis, the control unit 140 can control the GUI generation unit 150 to increase the GUI size. When the motion moves in the negative direction based on the z axis, the control unit 140 can control the GUI generation unit 150 to decrease the GUI size. Besides, the display of the GUI can be changed using the motion distance, the motion speed, and the motion pattern.

The control unit 140 can control the GUI generation unit 150 to generate the two-dimensional GUI and a cursor represented in the two dimensions, move the cursor in the two-dimensional GUI according to the user motion in the two axis directions of the three-dimensional space, and select a menu pointed to by the cursor according to the user motion of the remaining direction.

For example, the control unit 140 can move the cursor in the two-dimensional GUI by detecting the user motion in the x and y axis directions, and select the menu pointed to by the cursor in the two-dimensional GUI by detecting the user motion in the z axis direction. In so doing, when detecting the reciprocating user motion in the z axis direction or detecting the user motion over a preset distance in the z axis direction, the control unit 140 can select the menu.

When the menu is selected, the control unit 140 can adjust a setting value of the menu according to the user motion of one axis direction, among the user motion of the three axis directions. For example, after the menu is selected, upon detecting the user motion in the positive x axis direction, the control unit 140 can control to increase the setting value. When detecting the user motion in the negative x axis direction, the control unit 140 can control to decrease the setting value.

Figure 7:
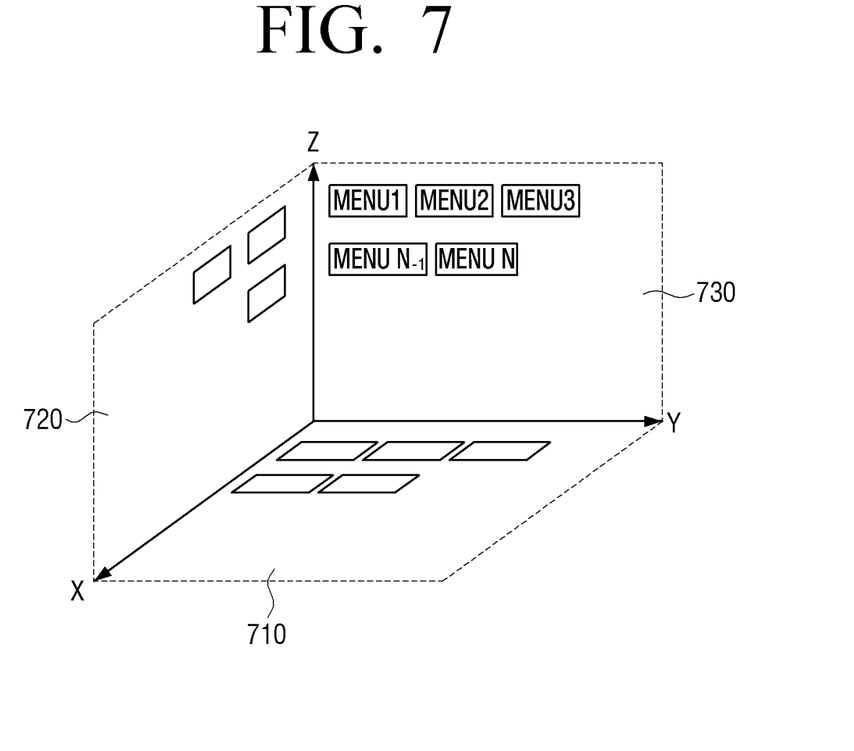
FIG. 7 is a diagram of a three-dimensional GUI controlled by the remote controller according to an exemplary embodiment.

The control unit 140 can control the GUI generation unit 150 to generate the three-dimensional GUI, change the display state of the three-dimensional GUI according to the user motion in the three-dimensional space, and select the menu, which shall be explained by referring to FIG. 7.

FIG. 4 depicts the remote controller 200 according to an exemplary embodiment. As shown in FIG. 4, the remote controller 200 for detecting the user motion in the three-dimensional space, includes a sensing unit 210, a remote controller signal generation unit 220, and a remote controller signal transmitting unit 230. The user motion can be detected through an index finger of the user or a bar-shaped sensing device.

The sensing unit 210 includes the plurality of the sensing arrays arranged in the plurality of the sides. For example, the sensing unit 210 can include the plurality of the sensing arrays arranged in the two sides, as shown in FIG. 1. The sensing unit 210 can detect the user motion of the x-y plane direction using the sensing array arranged in the lower side of FIG. 1, and detect the user motion of the z axis direction using the sensing array arranged in the lateral side, by way of example. The sensing unit 210 can detect the user motion in the three-dimensional space using the plurality of the sensing arrays arranged in three, four, or five sides.

Figure 9:
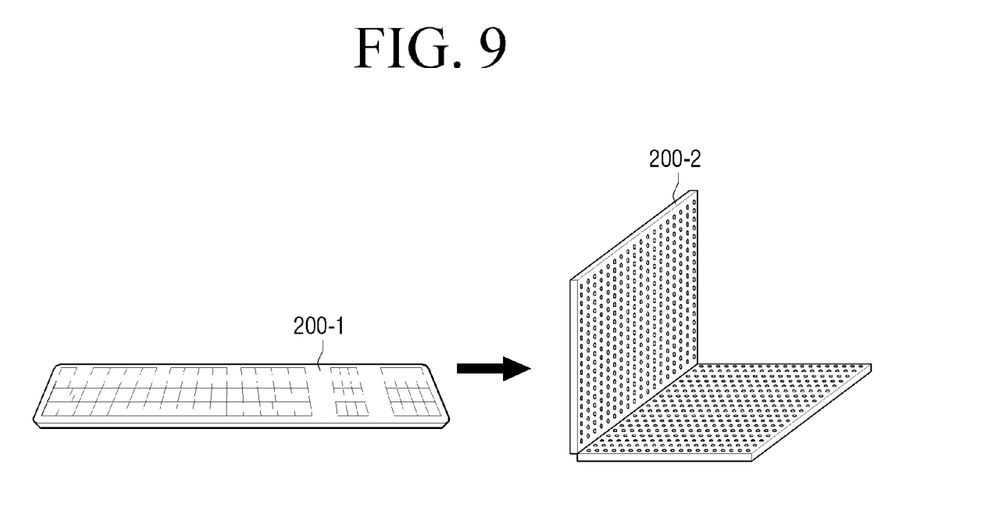
FIG. 9 is a diagram of a remote controlled usable as a keyboard according to an exemplary embodiment.

The lower side including the plurality of the sensing arrays of the remote controller 200 and the lateral side including the plurality of the sensing arrays of the remote controller 200 can be connected by a hinge. Thus, the lateral side and the lower side can rotate to open and close. That is, as shown in FIG. 9, when the lateral side and the lower side are closed, the remote controller 200 can be used as a keyboard 200-1. When the lateral side and the lower side are opened, the remote controller 200 can be used as a remote controller 200-2 for detecting the user motion in the three-dimensional space.

At this time, the sensing array includes a light emitting element for emitting the light and a light receiving element for receiving the reflected light. Accordingly, when the light produced by the light emitting element is reflected by a particular object or a user's hand, the light receiving element detects the reflected light and thus detects the user's motion for the corresponding coordinate value based on the refracted light.

The plurality of the sensors of the sensing arrays may have different operating frequencies. By varying the operating frequency of each sensor, detection fault of the sensors can be reduced.

While the sensing array can be implemented using one of an optical sensor, an ultrasonic sensor, a laser sensor, and an infrared sensor by way of example, the sensing array may be implemented using other sensors capable of sensing the user's motion.

The remote controller signal generation unit 220 generates the remote controller signal including the on/off information of the sensors, which is detected by the sensing unit 210.

The remote controller signal transmitting unit 230 transmits the generated remote controller signal to the external display apparatus 100. The remote controller signal transmitting unit 230 can transmit the remote controller signal using an infrared (IR) scheme.

Now, a method for controlling the GUI of the display apparatus is illustrated by referring to FIGS. 5A through 7.

Figure 5A:
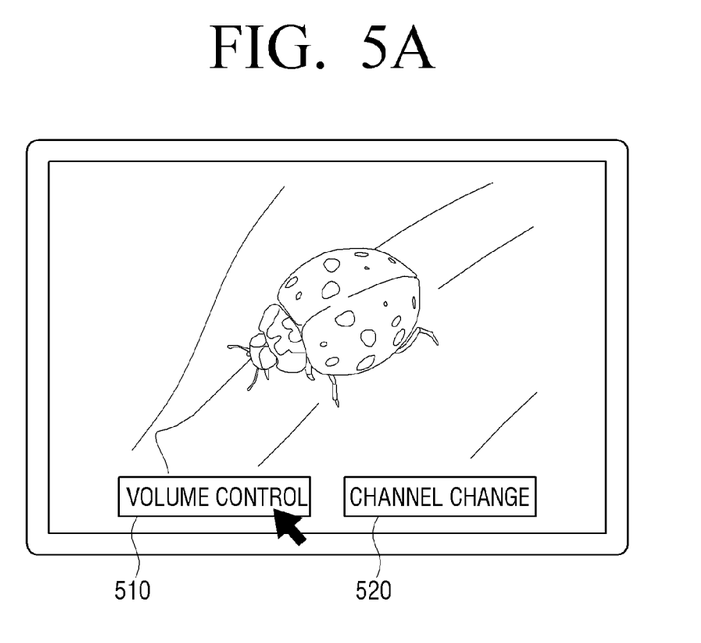
FIGS. 5A and 5B are diagrams of a method for adjusting a volume using the remote controller according to an exemplary embodiment.
Figure 5B:
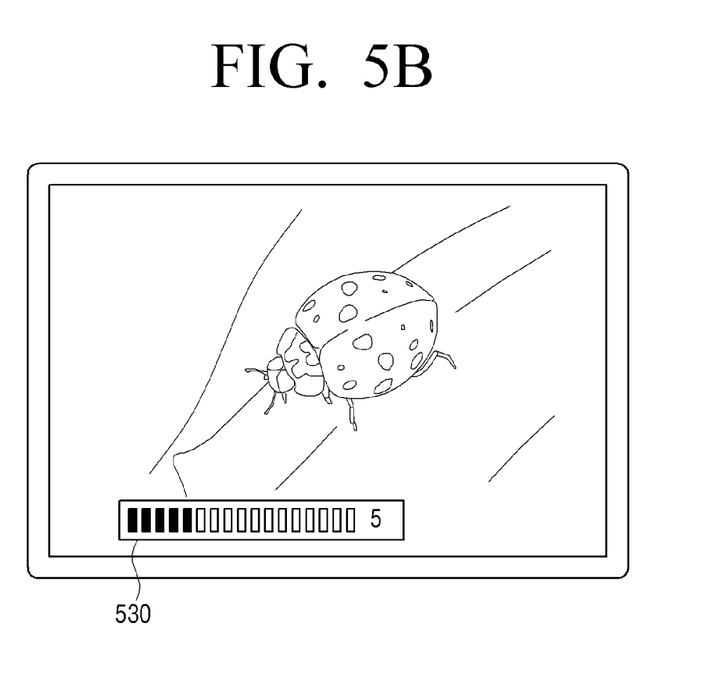

FIGS. 5A and 5B depict a method for adjusting a volume using the remote controller 200 according to an exemplary embodiment.

As shown in FIG. 5A, the display apparatus 100 generates and displays a volume control menu 510 and a channel change menu 520 in a display screen.

The display apparatus 100 detects the motion of the x and y axis directions in the user's motion detected in the three-dimensional space, and moves the cursor to the volume control menu 510, as shown in FIG. 5A.

When determining the continuous reciprocating motion in the z axis direction or determining the user motion over a preset distance in the z axis direction while the cursor stays in the volume control menu 510, the display apparatus 100 selects the volume control menu 510.

When the volume control menu 510 is selected, the display apparatus 100 removes the volume control menu 510 and the channel change menu 520 and generates a volume status control GUI 530, as shown in FIG. 5B, which may be a submenu of the volume control menu 510.

When detecting the user motion in the positive x axis direction while the volume status control GUI is generated, the display apparatus 100 raises the volume corresponding to the distance of the detected user motion. When detecting the user motion in the negative x axis direction, the display apparatus 100 lowers the volume corresponding to the distance of the detected user motion.

Figure 6A:
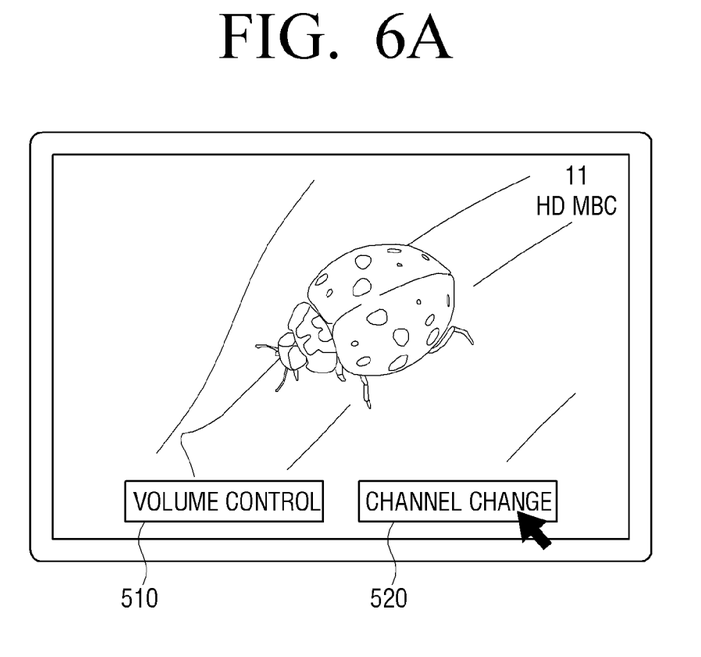
FIGS. 6A and 6B are diagrams of a method for changing a channel using the remote controller according to an exemplary embodiment.
Figure 6B:
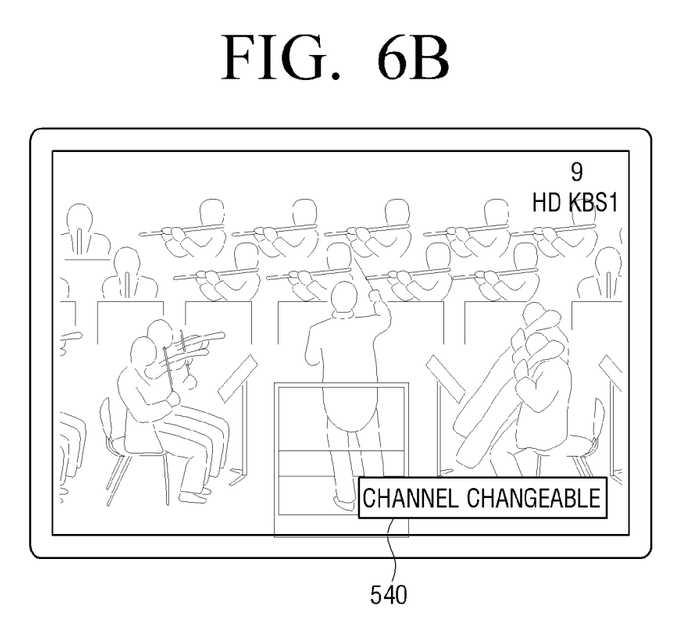

FIGS. 6A and 6B depict a method for changing a channel using the remote controller 200 according to an exemplary embodiment.

As shown in FIG. 6A, the display apparatus 100 generates and displays the volume control menu 510 and the channel change menu 520 in the display screen.

The display apparatus 100 detects the motion of the x and y axis directions in the user's motion detected in the three-dimensional space, and moves the cursor to the channel change menu 520 as shown in FIG. 6A.

When determining the continuous reciprocating motion in the z axis direction or determining the user motion over a preset distance in the z axis direction while the cursor stays in the channel change menu 520, the display apparatus 100 selects the channel change menu 520.

When the channel change menu 520 is selected, the display apparatus 100 removes the volume control menu 510 and the channel change menu 520 and generates a GUI 540 including information informing that the channel can be changed, as shown in FIG. 6B.

When detecting the user motion in the positive x axis direction while the GUI 540 including the channel changeable information is generated, the display apparatus 100 changes the channel in a first direction. When detecting the user motion in the negative x axis direction, the display apparatus 100 can change the channel in a direction opposite of the first direction. For example, when detecting the user motion in the negative x axis direction while a channel No. 11 (HD MBC) is displayed, as shown in FIG. 6A, the display apparatus 100 changes the channel to a channel No. 9 (HD KBS1) by decreasing the channel number.

Meanwhile, the detected motion of the user along the x, y and z axes used to move the cursor, to select the menu, and to change the setting are merely exemplary in FIGS. 5A through 6B, and other axes can be used to move the cursor and to modify the setting. For example, the display apparatus 100 can move the cursor using the x and z axes, select the menu using the y axis, and modify the setting using the x axis.

While the setting is modified by detecting the direction or the distance of the user motion in the exemplary embodiments, the setting can be altered using the speed or the pattern of the user motion.

While the volume control and the channel change are described in FIGS. 5A through 6B, the exemplary embodiments are applicable to change any setting value of the display apparatus 100 using the GUI.

FIG. 7 depicts a method for controlling the three-dimensional GUI according to an exemplary embodiment. As shown in FIG. 7, the three-dimensional GUI includes menus in an XY plane 710, menus in an XZ plane 720, and menus in a YZ plane 730. The planes 710, 720 and 730 can include different menus respectively. For example, the XY plane 710 can include a channel setting menu, the XZ plane 720 can include a sound setting menu, and the YZ plane 730 can include a screen setting menu.

To point to the menu in the XY plane 710, the display apparatus 100 can move the cursor by detecting the user motion of the x and y axis directions, and select the menu pointed by the cursor by detecting the user motion of the z axis direction.

Likewise, to point to the menu in the XZ plane 720, the display apparatus 100 can move the cursor by detecting the user motion of the x and z axis directions, and select the menu pointed by the cursor by detecting the user motion of the y axis direction.

Likewise, to point to the menu in the YZ plane 730, the display apparatus 100 can move the cursor by detecting the user motion of the y and z axis directions, and select the menu pointed by the cursor by detecting the user motion of the x axis direction.

When the user's motion has a particular pattern, the display apparatus 100 can change the locations of the XY plane 710, the XZ plane 720, and the YZ plane 730. For example, when the user motion rotates in the X-Y axis direction, the display apparatus 100 can change the locations of the XY plane 710, the XZ plane 720, and the YZ plane 730.

Meanwhile, the display apparatus 100 can control the GUI using other operations in FIGS. 5A through 7. For example, when detecting a particular user motion, the display apparatus 100 can change the locations of the menus in the respective planes of the three-dimensional GUI. When detecting a particular user motion, the display apparatus 100 can change the three-dimensional GUI to the two-dimensional GUI.

While the display apparatus 100 controls the GUI according to the user motion in the three-dimensional space by way of example in FIGS. 5A through 7, the display apparatus 100 can control other operations and/or capabilities of the display apparatus 100. For example, upon detecting a particular user motion in the three-dimensional space, the display apparatus 100 can control to turn off the display apparatus 100. When detecting a particular user motion in the three-dimensional space, the display apparatus 100 can change a connection source of the display apparatus 100, or may change its mode.

Figure 8:
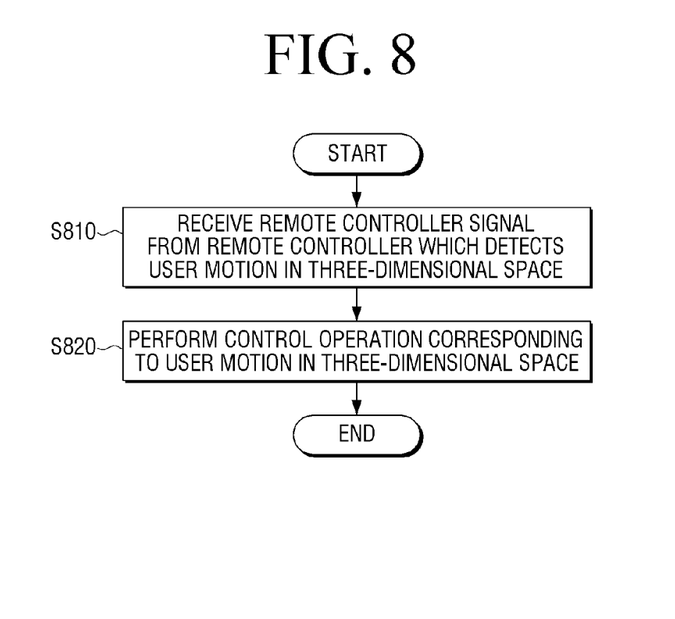
FIG. 8 is a flowchart of a method for controlling the display apparatus according to an exemplary embodiment.

Now, a method for controlling the display apparatus 100 using the remote controller 200 for detecting the user motion in the three-dimensional space is explained by referring to FIG. 8.

FIG. 8 is a flowchart of a method for controlling the display apparatus 100 according to an exemplary embodiment.

The display apparatus 100 receives the remote controller signal from the remote controller 200 which detects the user motion in the three-dimensional space defined by the plurality of the sensor arrays (S810). In so doing, the remote controller signal includes the information relating to the user motion in the three-dimensional space through the plurality of the sensor arrays arranged in the plurality of the sides. In more detail, the remote controller signal includes the on/off information of the plurality of the sensors arranged in the three-dimensional planes.

Upon receiving the remote controller signal from the remote controller 200, the display apparatus 100 can perform the control operation corresponding to the user motion in the three-dimensional space contained in the remote controller signal (S820). In detail, the display apparatus 100 can generate or control the GUI according to the user motion of the three-dimensional space, and operations of the display apparatus 100. For example, the display apparatus 100 can change the display of the generated GUI, and select or adjust the GUI according to the user motion of the three-dimensional space as shown in FIGS. 2 through 7.

At this time, the user motion can include the direction, the speed, the distance, and the pattern of the user motion.

As set forth above, by controlling the display apparatus 100 using the remote controller 200 which detects the user motion in the three-dimensional space, the user can intuitively and easily control the display apparatus 100.

The exemplary embodiments may be embodied by an apparatus, for example a television, that includes a bus coupled to every unit of the apparatus, at least one processor (e.g., central processing unit, microprocessor, etc.) that is connected to the bus for controlling the operations of the apparatus to implement the above-described functions and executing commands, and a memory connected to the bus to store the commands, received messages, and generated messages.

As will be understood by the skilled artisan, the exemplary embodiments may be implemented by any combination of software and/or hardware components, such as a Field Programmable Gate Array (FPGA) or Application Specific Integrated Circuit (ASIC), which performs certain tasks. A unit or module may advantageously be configured to reside on the addressable storage medium and configured to execute on one or more processors or microprocessors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or modules or further separated into additional components and units or modules.

Although a few exemplary embodiments have been shown and described, it would be appreciated by those skilled in the art that changes may be made in these exemplary embodiments without departing from the principles and spirit of the invention, the scope of which is defined in the claims and their equivalents.

What is claimed is:

1. A display apparatus comprising:
   a display;
   a signal receiver that receives a wireless signal from a remote controller, the wireless signal indicating a user motion detected by the remote controller in a three-dimensional space defined by a plurality of sensor arrays arranged in three axis directions of the three-dimensional space, a plurality of sensors being disposed in each of the three axis directions such that a position of the user motion in the three-dimensional space corresponding to a location of sensors of the sensor arrays, the sensors detecting the user motion, the wireless signal includes on/off information of the plurality of sensors; and
   a controller that calculates a coordinate value for the user motion in the three-dimensional space using the on/off information of the plurality of sensors, and performs a control operation to control the display apparatus according to the calculated coordinate value indicating the user motion in the three-dimensional space, wherein the controller displays a three-dimensional GUI, the three-dimensional GUI comprising a plurality of menus in a plurality of planes in the three-dimensional space, each plane having a menu therein, and the controller is configured to change a display status of the three-dimensional GUI in accordance with the user motion relative to the plane having the menu to be selected.

2. The display apparatus of claim 1, wherein the controller controls to change a GUI displayed on the display according to attributes of the user motion of the three-dimensional space detected by the remote controller and received in the wireless signal from the remote controller, and wherein the attributes of the user motion comprise at least one of a motion direction, a motion distance, a motion speed, and a motion pattern.

3. The display apparatus of claim 1, wherein the controller moves a cursor displayed on a GUI represented in two dimensions according to a user motion of two axis directions in the three-dimensional space, and selects an item of the GUI pointed to by the cursor according to a user motion of a remaining axis direction other than the two axis directions.

4. The display apparatus of claim 3, wherein, when the item of the GUI is selected, the controller adjusts a setting value of the item according to user motion of one axis direction in the user motion of the three axis directions.

5. The display apparatus of claim 4, wherein, when the item is a volume control menu and the volume control menu is selected, the controller increases a volume of the display apparatus as the user motion of the one axis direction moves in a first direction, and decreases the volume of the display apparatus as the user motion of the one axis direction moves in a second direction that is opposite the first direction.

6. The display apparatus of claim 4, wherein, when the item is a channel change menu and the channel change menu is selected, the controller increases a channel of the display apparatus as the user motion of the one axis direction moves in a first direction, and decreases the channel of the display apparatus as the user motion of the one axis direction moves in a second direction that is opposite the first direction.

7. The display apparatus of claim 1, wherein the controller detects a center sensor or an outermost sensor in each axis direction based on locations of sensors detecting the user motion with respect to each of the plurality of the sensor arrays, and determines the user motion according to a coordinate value indicating a location of the detected center sensor or outermost sensor.

8. The display apparatus of claim 1, wherein the plurality of the sensor arrays have different operating frequencies.

9. A method of controlling a display apparatus, the method comprising:

receiving a wireless signal from a remote controller, the wireless signal indicating a user motion detected by the remote controller in a three-dimensional space defined by a plurality of sensor arrays arranged in three axis directions of the three-dimensional space, a plurality of sensors being disposed in each of the three axis directions such that a position of the user motion in the three-dimensional space corresponding to a location of sensors of the sensor arrays, the sensors detecting the user motion, the wireless signal includes on/off information of the plurality of sensors;

calculating a coordinate value for the user motion in the three-dimensional space using the on/off information of the plurality of sensors; and controlling the display apparatus according to the calculated coordinate value indicating the user motion in the three-dimensional space, wherein the controlling further comprises:
displaying a three-dimensional GUI on a display of the display apparatus, the three-dimensional GUI comprising a plurality of menus in a plurality of planes in the three-dimensional space, each plane having a menu therein, changing a display status of the three-dimensional GUI in accordance with the user motion relative to the plane having the menu to be selected.

10. The method of claim 9, wherein the controlling comprises:

changing display of a Graphical User Interface (GUI) displayed on a display according to attributes of the user motion of the three-dimensional space detected by the remote controller and received in the wireless signal from the remote controller, wherein the attributes of the user motion comprise at least one of a motion direction, a motion distance, a motion speed, and a motion pattern.

11. The method of claim 9, wherein the controlling further comprises:

moving a cursor displayed on a two-dimensional GUI according to a user motion of two axis directions in the three-dimensional space, and selecting an item of the two-dimensional GUI pointed to by the cursor according to a user motion of a remaining axis direction.

12. The method of claim 11, wherein the controlling further comprises:

when the item of the GUI is selected, adjusting a setting value of the item according to user motion of one axis direction in the user motion of the three axis directions.

13. The method of claim 12, wherein, when the item is a volume control menu, the controlling further comprises:

when the volume control menu is selected, increasing a volume of the display apparatus as the user motion of the one axis direction moves in a first direction and decreasing the volume of the display apparatus as the user motion of the one axis direction moves in a second direction that is opposite the first direction.

14. The method of claim 12, wherein, when the item is a channel change menu, the controlling further comprises:

when the channel change menu is selected, increasing a channel of the display apparatus as the user motion of the one axis direction moves in a first direction, and decreasing the channel of the display apparatus as the user motion of the one axis direction moves in a second direction that is opposite the first direction.

15. The method of claim 9, wherein the controlling comprises detecting a center sensor or an outermost sensor in each axis direction based on locations of sensors detecting the user motion with respect to each of the plurality of the sensor arrays, and determining the user motion according to a coordinate value indicating a location of the detected center sensor or outermost sensor.

16. The method of claim 9, wherein the plurality of the sensor arrays have different operating frequencies.

17. A remote controller comprising:
a sensor that senses user motion in a three-dimensional space defined by a plurality of sensor arrays arranged in three axis directions of the three-dimensional space, a plurality of sensors being disposed in each of the three axis directions such that a position of the user motion in the three-dimensional space corresponding to a location of sensors of the sensor arrays, the sensors detecting the user motion; and a remote controller signal transmitter that transmits a wireless signal indicating the sensed user motion to a display apparatus, wherein the wireless signal includes on/off information of the plurality of sensors so that the display apparatus calculates a coordinate value for the user motion in the three-dimensional space using the on/off information of the plurality of sensors, and wherein the wireless signal includes a signal for displaying a three-dimensional GUI, the three-dimensional GUI comprising a plurality of menus in a plurality of planes in the three-dimensional space, each plane having a menu therein, and changing a display status of the three-dimensional GUI in accordance with the user motion relative to the plane having the menu to be selected.

18. The remote controller of claim 17, wherein the sensor comprises:

a first sensor and a second sensor, respectively, arranged in a matrix form and connected by a hinge, wherein the first sensor and the second sensor are rotated based on the hinge to open and close the remote controller.

19. The remote controller of claim 17, wherein the plurality of the sensor arrays have different operating frequencies.

20. A display system comprising:

a display apparatus, the display apparatus comprising:

a display;

a signal receiver that receives a wireless signal, the wireless signal identifying motion of a user in a three-dimensional space; and a processor that controls an operation of the display apparatus based on the motion of the user in the three-dimensional space identified by the wireless signal received by the signal receiver; and a remote controller, the remote controller comprising:

a plurality of sensors arranged in each direction of three axis directions and detect the motion of the user in the three-dimensional space; and a signal transmitter that transmits to the display apparatus the wireless signal identifying the motion of the user in the three-dimensional space detected by the sensor, wherein a plurality of sensors being disposed in each of the three axis directions such that a position of the user motion in the three-dimensional space corresponds to a location of the sensors detecting the user motion, wherein the wireless signal includes on/off information of the plurality of sensors, wherein the processor of the display apparatus calculates a coordinate value for the user motion in the three-dimensional space using the on/off information of the plurality of sensors and controls the operation of the display apparatus based on the calculated coordinate value, and wherein the processor displays a three-dimensional GUI, the three-dimensional GUI comprising a plurality of menus in a plurality of planes in the three-dimensional space, each plane having a menu therein, and the processor is configured to change a display status of the three-dimensional GUI in accordance with the user motion relative to the plane having the menu to be selected.

21. The display system of claim 20, wherein the processor determines that the motion of the user in the three-dimensional space corresponds to one of a channel change command to change a channel of the display apparatus and a volume change command to change a volume of the display apparatus, and the processor one of changes the channel of the display apparatus based on the channel change command and changes the volume of the display apparatus based on the volume change command.

* * * * *